Nov. 15, 1932.  J. R. PEIRCE  1,887,849
COFFEE MAKING DEVICE
Filed July 7, 1930    4 Sheets-Sheet 1

INVENTOR.
JOHN ROYDEN PEIRCE
BY
ATTORNEY.

Nov. 15, 1932.  J. R. PEIRCE  1,887,849
COFFEE MAKING DEVICE
Filed July 7, 1930    4 Sheets-Sheet 2

INVENTOR.
JOHN ROYDEN PEIRCE
BY
ATTORNEY.

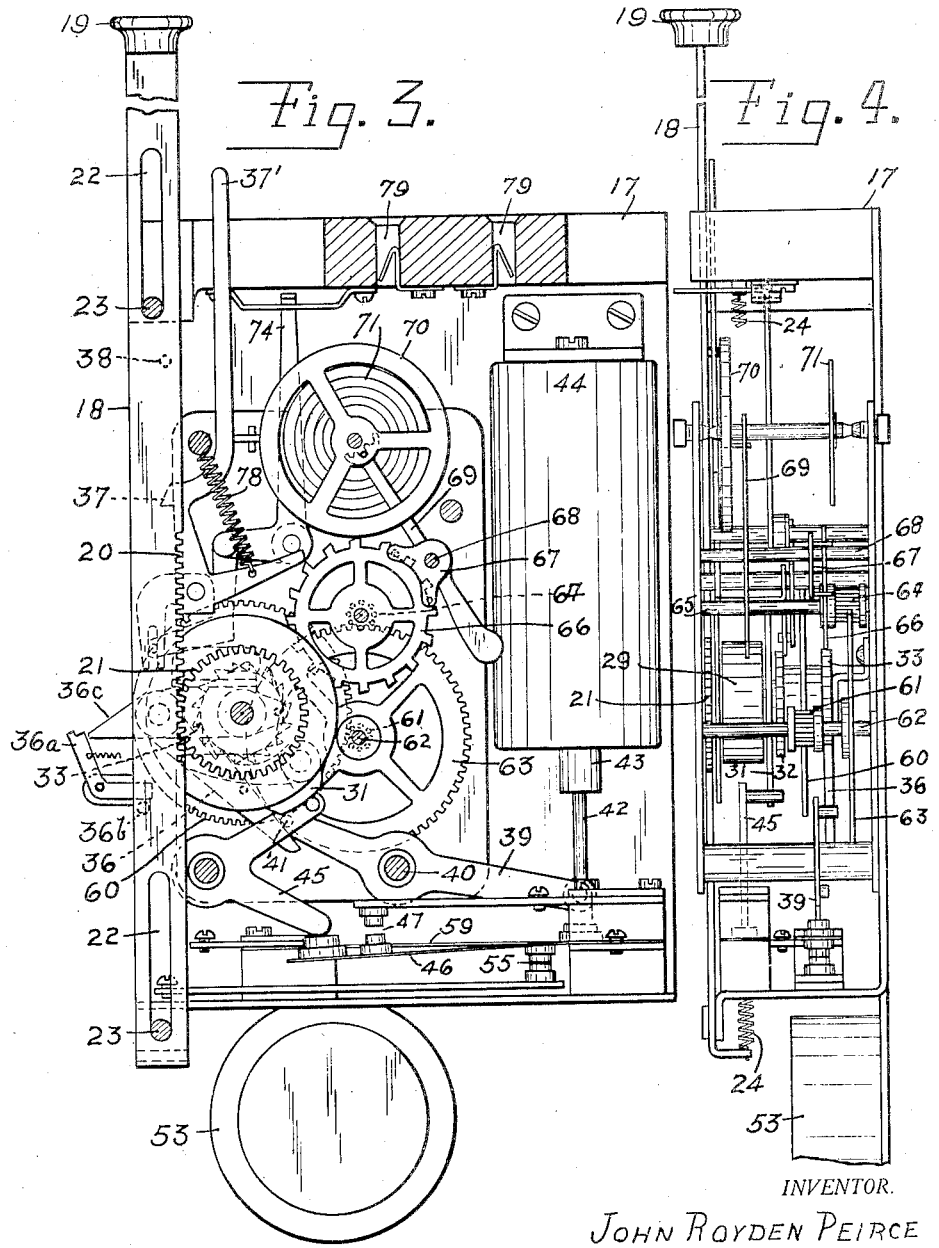

Nov. 15, 1932. J. R. PEIRCE 1,887,849
COFFEE MAKING DEVICE
Filed July 7, 1930  4 Sheets-Sheet 4
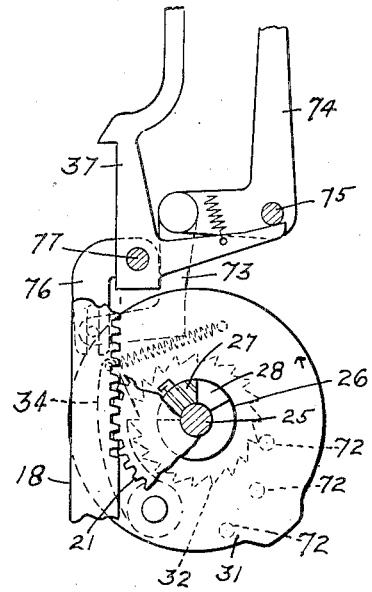
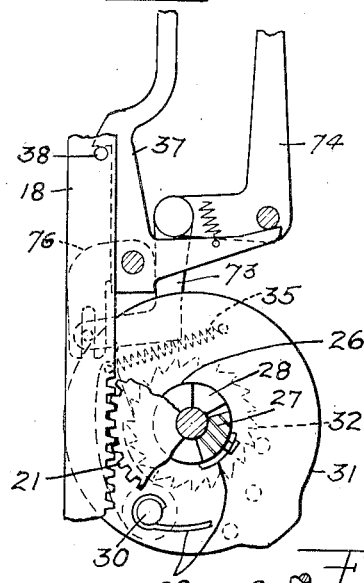
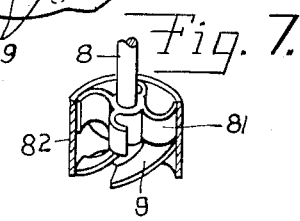
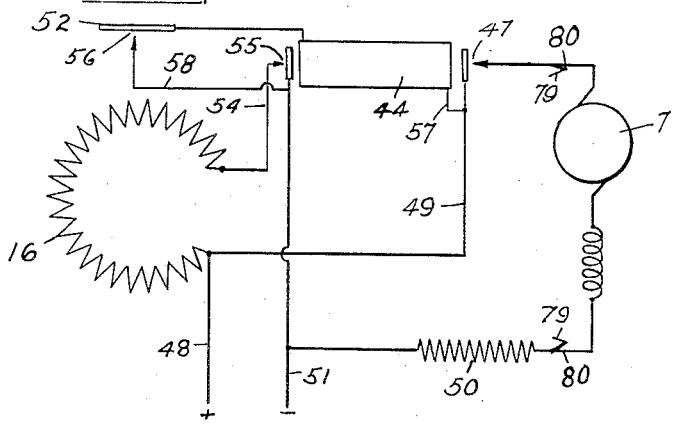
INVENTOR.
JOHN ROYDEN PEIRCE
BY
ATTORNEY.

Patented Nov. 15, 1932

1,887,849

UNITED STATES PATENT OFFICE

JOHN ROYDEN PEIRCE, OF NEW YORK, N. Y.

COFFEE MAKING DEVICE

Application filed July 7, 1930. Serial No. 465,860.

This invention relates to coffee brewing devices and more particularly to electrically heated and automatically controlled coffee pots.

An object of the invention is to produce a device for brewing coffee in which the grounds and water are kept separated until the water reaches the desired temperature and are then brought together by an automatic heat controlled device.

Another object is to provide means for automatically discontinuing the contact between the grounds and water after a predetermined duration of time.

Another object is to provide means to thereafter maintain the coffee at a substantially constant predetermined temperature.

Another object is to provide means for raising the heated water and pouring it over the grounds contained in a basket in the upper part of the pot.

Another object is to provide means for causing the water to enter the grounds with a whirling motion to induce a vigorous commingling of the water and grounds to hasten the brewing process.

Another object is to provide a device in which the water is raised and poured over the grounds at a relatively rapid rate also to hasten the process of brewing.

Other objects will appear in the following description of the invention:

Referring to the drawings wherein I have shown what I now consider to be the preferred form of my invention:

Fig. 3 is an elevation of mechanism for controlling the operation of the device.

Fig. 4 is a side view of the mechanism shown in Fig. 3 with a portion omitted to more clearly show other parts.

Figs. 5 and 6 are details of means for controlling the timing of the operation of the device.

Fig. 7 is a detail of a device for raising the water and at the same time causing it to whirl around so as to stir up the coffee grounds when it enters.

Fig. 8 is a wiring diagram of the electric heating and control system.

Figure 1:
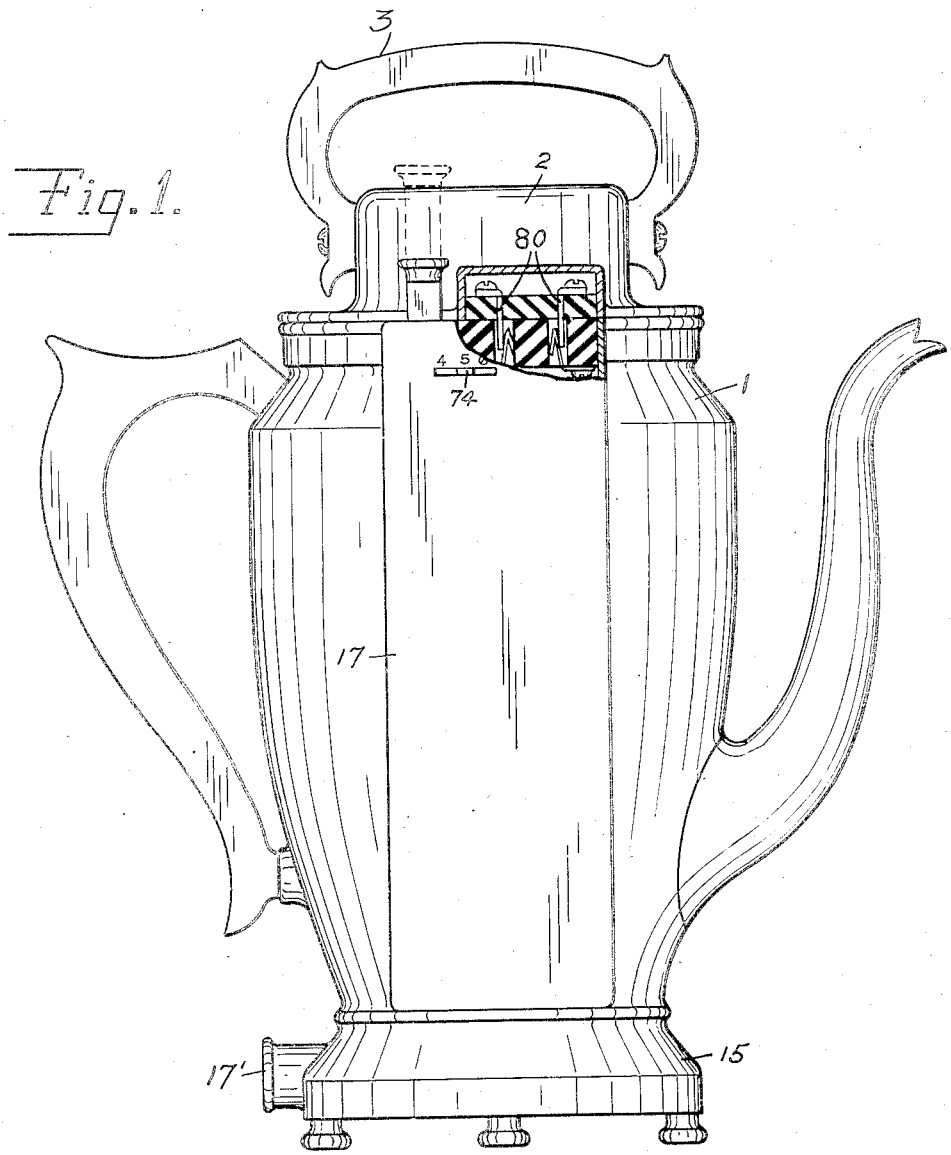
Fig. 1 is a side elevation of a coffee pot embodying my invention.

In the drawings the coffee pot 1 is provided with a cover 2 having a handle 3. A plate or disk 4 attached to the lower portion of the cover encloses the chamber 5 within the cover. Attached to the plate 4 and depending therefrom is a cylindrical tube 6. Within the chamber in the cover is an electric motor 7, the shaft 8 of which reaches down through the tube 6. Fixed on the lower end of the shaft, within the tube, is a propeller or lifting pump 9. A perforated basket 10 adapted to contain coffee grounds is carried by the tube 6 and is detachably secured thereto at 11. A tubing or sleeve 12 integral with the basket may be split vertically in several places so that it can press resiliently against the tube 6 and cooperate with a circumferential ridge on the tube to support the basket in the upper part of the pot. The basket may be provided with a cover 13. The upper portion of the tube 6 has several holes 14 so that water when raised in the tube will flow over into the basket. Operation of the motor 7 will turn the propeller or pump 9 to raise the water in the tube.

Figure 2:
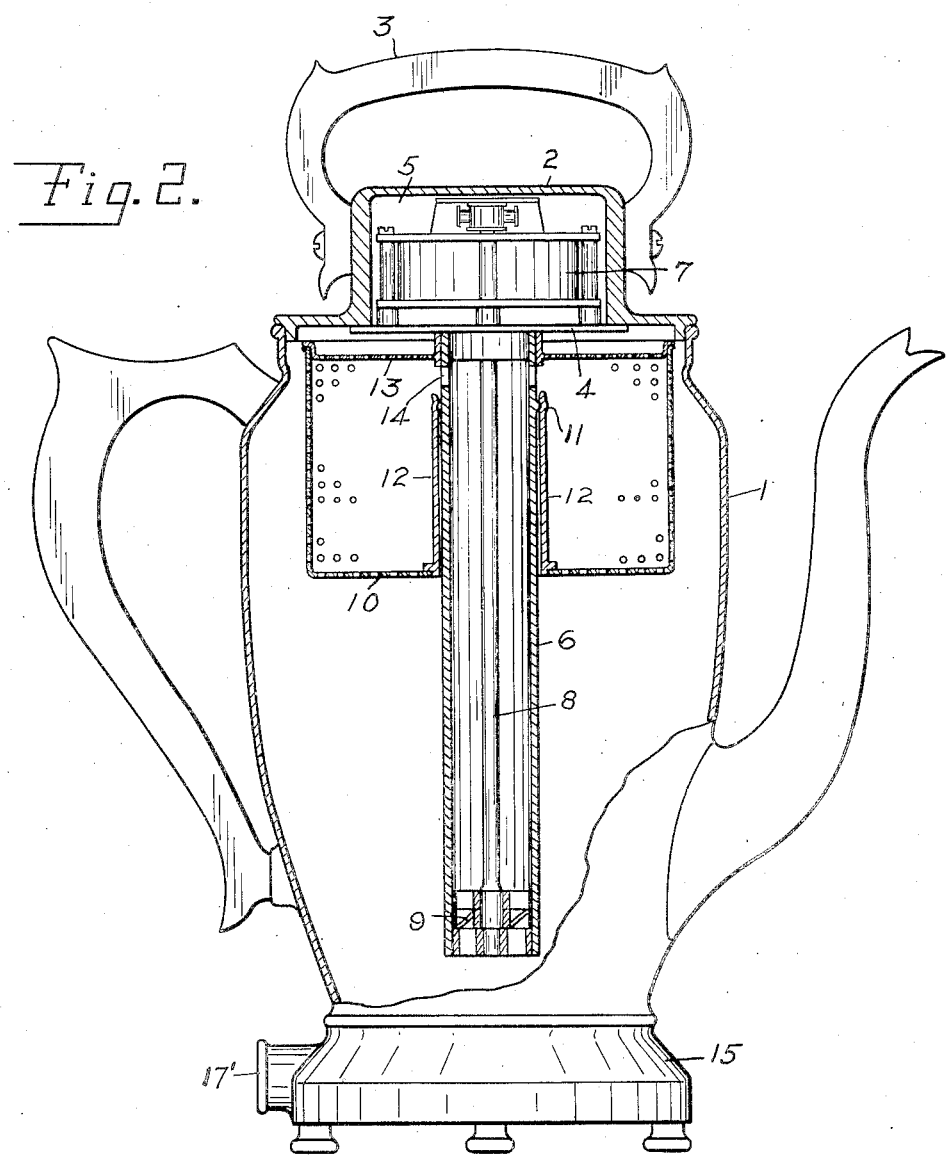
Fig. 2 is a side elevation of the pot in section, showing the interior with the container for grounds and means for raising the water and pouring it over the grounds.

Within the base 15 of the pot is an electric heating coil not visible in Figs. 1 and 2 but shown at 16 in the wiring diagram, Fig. 8. The wires may be plugged in at 17 to supply current to the coil.

Attached to the side of the pot is a casing 17 containing timing and other control mechanisms. This mechanism includes a rod or stem 18 having a key or button 19 at its top and being provided with gear teeth 20 meshing with a gear 21. The rod is provided with slots 22 by which it is mounted on studs 23. A spring 24 (Fig. 4) connected between the lower end of the rod and the upper part of the casing 17 tends to raise the rod to the position of Fig. 3. The gear 21 is loose on shaft 25 but is fixed to one portion of a split sleeve 26 having a lateral projection 27 adapted to cooperate with a similar projection 28 on the other portion. One end of a clock spring 29 is attached to the sleeve or projection 27 on gear 21 and the other end to a stud 30 fixed to a cam 31 to which the projection 28 is fixed. Only the ends of the spring are shown in Fig. 6; the intermediate portion being omitted to permit a clearer showing of other elements. Loosely mounted on shaft 25 but fixed with respect to each other are two ratchet wheels 32, 33. Ratchet 32 cooperates with a pawl 34 carried by the cam 31 and actuated by spring 35. A pawl 36 carried by the casing 17 is spring-pressed into cooperation with ratchet 33.

When the stem 18 is depressed, it turns gear 21 and winds the spring 29, tending to turn cam 31 in a counterclockwise direction. The cam is prevented from turning, however, by pawl 34 cooperating with ratchet 32, which as stated, is fixed to ratchet 33 which, in turn, is held by pawl 36. The stem 18 will be latched in depressed position by a latch 37 cooperating with a pin 38 fixed in the stem.

An arm 39 (Fig. 3) pivoted at 40 has a pin 41 adapted to cooperate with pawl 36 to press the latter out of contact with ratchet 33. The other end of this arm is connected to a rod 42 attached to the armature 43 of a solenoid 44. Energization of the solenoid rocks arm 39 and moves pawl 36 to free ratchet 33. This permits the cam 31 to commence to turn under the action of spring 29. The cam turns in a counterclockwise direction and soon after commencing to turn, frees a bell crank arm 45 to rock slightly upward under the pressure of an electric contact leaf spring 46. Contacts 47 are thus closed, completing a circuit from the positive side 48 of the line (Fig. 8), through wire 49, contacts 47, motor 7, resistance 50 and back to the negative side 51 of the line. The motor then commences to operate the pump to raise water through the tube 6, causing it to flow through the holes 14 into the basket 10.

Included in the circuit of the solenoid is a thermostat contact device 52 contained in a case 53 within the casing 17 and attached to the side of the pot. When the current is turned on, it flows from the positive side of the line, through the heating coil 16, wire 54, contacts 55 which are normally closed and back to the negative side of the line. As the water in the pot is heated, it affects the condition of the thermostat. When the temperature of the water reaches the desired point, the thermostat closes contacts 56, completing the circuit through wires 49, 57, solenoid 44, contacts 56, wire 58 and back to the line. It is then that the solenoid operates to free the cam 31 and to start the operation of the motor.

The stem 42 of the solenoid also normally presses down upon the leaf spring 59, of contacts 55, holding them closed. When the solenoid is energized and its stem 42 is raised, the contacts 55 open and break the circuit through the heating coil as will be seen in Fig. 8. As the water in the pot cools slightly, the thermostat contacts 56 will open, de-energizing the solenoid. This will permit contacts 55 to close again so that the heating coil will once more raise the temperature of the water until the thermostat contacts are again closed. The water in the pot is thus maintained at a substantially constant predetermined temperature.

After the first operation of the solenoid depresses pawl 36 to free the ratchet 33, the pawl is thereafter prevented from returning to position to latch the ratchet, and the cam 31 continues to turn regardless of the operations of the solenoid. A latch 36a held out by a pin 36b on the stem 18 will latch the projection 36c of pawl 36 and hold the pawl out until the stem again restores to upper position when pin 36b will remove the latch 36a and let pawl 36 cooperate with ratchet 33.

Fixed with respect to cam 31 and ratchets 32, 33 is a gear 60 forming part of a clock or timing device. This gear meshes with a pinion 61 fixed on shaft 62 on which is also fixed a gear 63 meshing with a pinion 64 on shaft 65. This shaft carries an escapement wheel 66 which cooperates with an escapement member 67 pivoted at 68. Also fixed on shaft 68 is an arm 69 cooperating with a pin in a balance wheel 70 associated with a balance spring 71. When the cam 31 is released to turn, the clock mechanism also commences to operate and controls the speed at which the cam turns. Fixed in the side of the cam are three pins 72 adapted to come into engagement with arm 73 pivotally attached to an arm 74 which, in turn, is pivoted at 75. The other end of arm 73 is connected by pin and slot to an arm 76 fixed with respect to the latch 37, both of which are pivoted at 77. When one of the pins 72 engages arm 73 it will move the latter to the left, rocking arm 76 and latch 37 clockwise against the action of spring 78, thus unlatching the stem 18 and permitting it to be raised by its spring 24. This will turn gear 21 clockwise and with it the projection 27. The latter will engage projection 28 and carry it along with the cam 31. The cam will thus be restored to normal position as in Fig. 3, rocking arm 45 downwardly and opening contacts 47. The motor will then stop and the pumping operation will cease. The thermostat will continue to control the contacts 56 and solenoid 44. This will control contacts 55 and the flow of current through the heating coil 16. In this way the coffee in the pot will be maintained at a substantially even temperature.

By rocking the arm 74 on its pivot 75, the arm 73 may be raised or lowered into the path of any one of the three pins 72. This will vary the lapse of time between the beginning of the pumping operation and the ending thereof. Thus the user may regulate the device to produce coffee of the desired strength.

If, after the stem 18 has been depressed, it is desired to stop the operation without waiting for the timing mechanism to release the stem, this may be done by moving the arm 37' to the right. This will rock latch 37 away from the pin 38 and permit the stem to rise.

To supply current to the motor, electric contact sockets 79 carried by the pot are adapted to cooperate with terminals 80 carried by the cover.

As shown in Fig. 7, the pump for raising the water in the tube 6 comprises besides the lifting blades 9, the centrifugal blades 81. This combination of blades working together makes a very satisfactory pump. Also, I have found that where the pump blades work freely in the tube, coffee grounds sometimes become wedged between the blades and the inner surface of the tube. This may be overcome by surrounding the blades with a collar 82 fixed to the blades and turning therewith. The collar turns within the tube 6.

An important feature of my device is that the coffee grounds basket 10 is much larger than that used in existing percolators. The size, for instance, may be such that the grounds will only half fill the basket. This will permit the grounds to be stirred about freely by the inflowing water. Also, the holes 14 are cut tangentially through the walls of the tube 6, so that water will tend to whirl around as it flows into the basket. This will produce agitation of the grounds in the water to hasten the brewing process. The parts are so designed that a very rapid flow of water takes place. In an average domestic size of pot, for instance, the pump may be designed to lift in the neighborhood of fifty cups of water in four and a half minutes. Thus, where the device is set to operate for this length of time, the entire body of water in a pot holding four cups will be passed through the grounds approximately twelve times during the coffee making process. By pumping the water at this rapid rate the making of the coffee is completed in much less time than is required in the usual percolating and other systems. This rapid process is essential to the making of good coffee.

Having described my invention, what I claim is:

1. In a coffee making device, a pot, a grounds container within the pot, a pump for raising water from the pot into the container, a timing device and a thermostat controlled by the temperature of the water in the pot for initiating the operation of said pump and said timing device, said timing device being adapted to stop the operation of the pump.

2. In a coffee making device, a pot, a grounds container within the pot, means for heating water in the pot, means for raising water from the pot into the grounds container, a timing device, a thermostat controlled by the temperature of the water in the pot for controlling said heating means and for initiating the operation of said raising means and the timing device, the timing device being adapted to stop the operation of the raising means.

3. In a coffee making device, a pot, a grounds container associated with the pot, a pump for raising water from the pot into the container, a timing device, a thermostat controlled by the temperature of the water in the pot for initiating the operation of said timing device, and means for initiating operation of said pump when the timing device commences to operate, said timing device being adapted to stop the operation of the pump.

Signed at New York city in the county of New York and State of New York this second day of July A. D. 1930.

JOHN ROYDEN PEIRCE.